United States Patent
Saylik et al.

(10) Patent No.: US 11,970,273 B2
(45) Date of Patent: Apr. 30, 2024

(54) SEAT ASSEMBLY HAVING A CONDUCTIVE SUBSTRATE LAYER

(71) Applicant: The Boeing Company, Chicago, IL (US)

(72) Inventors: Murat Saylik, Oklahoma City, OK (US); Joseph A. Bolton, Dubuque, IA (US)

(73) Assignee: The Boeing Company, Chicago, IL (US)

(*) Notice: Subject to any disclaimer, the term of this patent is extended or adjusted under 35 U.S.C. 154(b) by 1041 days.

(21) Appl. No.: 16/855,928

(22) Filed: Apr. 22, 2020

(65) Prior Publication Data
US 2021/0331807 A1 Oct. 28, 2021

(51) Int. Cl.
| | |
|---|---|
| *B64D 11/06* | (2006.01) |
| *B64D 45/02* | (2006.01) |
| *H01P 1/203* | (2006.01) |
| *H05F 1/00* | (2006.01) |
| *H05F 3/00* | (2006.01) |

(52) U.S. Cl.
CPC .......... *B64D 11/0647* (2014.12); *B64D 45/02* (2013.01); *H01P 1/203* (2013.01); *H05F 1/00* (2013.01); *H05F 3/00* (2013.01)

(58) Field of Classification Search
CPC ............ B64D 11/0647; B64D 11/0646; B64D 45/02; H01P 1/203; H05F 1/00; H05F 3/00; H05F 3/02
USPC ......................................................... 361/212
See application file for complete search history.

(56) References Cited

FOREIGN PATENT DOCUMENTS

| | | | | |
|---|---|---|---|---|
| CN | 209058478 U | * | 7/2019 | |
| DE | 102007062111 A1 | * | 7/2009 | ............... B64C 1/18 |
| JP | H07329625 A | * | 12/1995 | |
| JP | H09193739 A | * | 7/1997 | |

OTHER PUBLICATIONS

T. Hiramoto, T. Terauchi and J. Tomibe, "Controlling ESD and absorbing and shielding EMW by using conductive fiber in aircraft," Electrical Overstress/ Electrostatic Discharge Symposium Proceedings. 1998 (Cat. No. 98TH8347), Reno, NV, USA, 1998, pp. 18-21, doi: 10.1109/EOSESD.1998.737017 (Year: 1998).*

\* cited by examiner

*Primary Examiner* — Thienvu V Tran
*Assistant Examiner* — Sreeya Sreevatsa
(74) *Attorney, Agent, or Firm* — Jordan IP Law, LLC

(57) ABSTRACT

Examples provide a seat assembly, a system including the seat assembly and a method for reducing electromagnetic interference in an aircraft. A seat assembly for an aircraft includes a frame having a base and a support member operatively coupled to the base. A seat is coupled to the base and a first side of the support member. The seat includes a conductive substrate layer configured to absorb electrical charges.

23 Claims, 7 Drawing Sheets

SEAT ASSEMBLY HAVING A CONDUCTIVE SUBSTRATE LAYER

BACKGROUND

Electromagnetic interference, often referred to as electromagnetic field output or radio frequency output, resulting from an increasing number of passengers using personal electronic devices during a flight, for example, may produce undesired interference with the aircraft's navigation and/or communication equipment and systems. To reduce electromagnetic interference, device manufacturers are bound by certification requirements; however, passengers may generate the undesired electromagnetic interference by use of their personal electronic devices. As a result, one conventional approach taken by many airline companies to reduce the electromagnetic interference within the aircraft is to prohibit the use of personal electronic devices during critical stages of flight, e.g., during takeoff and during landing of the aircraft. However, this approach remains a key complaint of many passengers.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed to a seat assembly for an aircraft. The seat assembly includes a frame having a base and a support member operatively coupled to the base. A seat is coupled to the base and at least a first side of the support member. The seat includes a conductive substrate layer configured to absorb electrical charges. In some implementations, the conductive substrate layer is electrically coupled to the base. This seat assembly provides a grounding or earthing effect for the passenger that may absorb undesired electrical charges from the passenger's body. Further, each seat assembly, individually or collectively with adjacent seat assemblies, is configured to prevent or limit transmission of electromagnetic interference between seat assemblies in a common row and/or between seat assemblies in adjacent rows to reduce the negative effects of electromagnetic interference on the passengers and/or the aircraft's navigation and communication equipment and systems.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
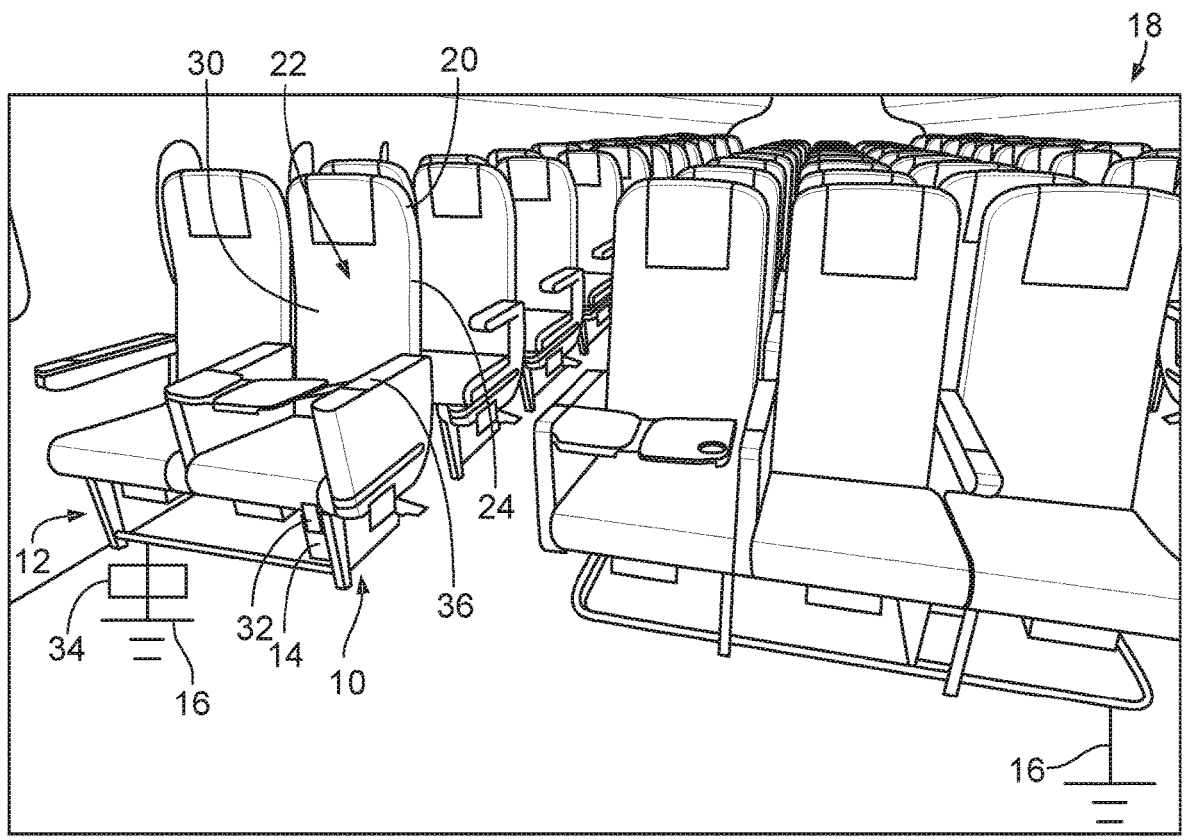
FIG. 1 is a perspective view of an example plurality of seat assemblies configured in a row in an aircraft, according to various embodiments.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Because undesired electromagnetic interference (EMI) may interfere with an aircraft's navigation and/or communication equipment and systems, airline companies often restrict or prohibit the use of personal electronic devices during critical stages of flight. This approach, however, may lead to passenger complaints and non-compliance.

Aspects of the disclosure provide a seat assembly configured to absorb electrical charges emitted by or transmitted through a passenger sitting in the seat assembly, which may provide health benefits to the passenger, as well as prevent or limit EMI transmission between seat assemblies in a common row and/or between seat assemblies in adjacent rows.

In implementations described herein, a seat assembly for an aircraft, includes a frame comprising a base and a support member operatively coupled to the base. A seat is coupled to the base and a first side of the support member. The seat includes a conductive substrate layer configured to absorb electrical charges. In a particular implementation, a seat assembly includes a seat having a conductive substrate layer configured to contact a user sitting in the seat, e.g., a passenger of the aircraft, and absorb electrical charges from the user, as well as limit transmission of electromagnetic interference (EMI) between adjacent seat assemblies. The conductive substrate layer is electrically coupled to the base of the seat assembly, which is electrically coupled to an electric ground of the aircraft. In a system for reducing EMI in an aircraft, a plurality of seat assemblies is configured in a row. Each seat assembly, individually or collectively with adjacent seat assemblies in a common row and/or in an adjacent row, is configured to at least partially generate or define a ground plane to prevent or limit transmission of EMI between seat assemblies in the common row and/or between seat assemblies in the adjacent rows. As used herein, the term electromagnetic interference (EMI), also referred to as radio-frequency interference (RFI) within the radio frequency spectrum, refers to a disturbance generated by an external source that affects an electrical circuit by electromagnetic induction, electrostatic coupling, or conduction, for example. The disturbance may negatively affect the performance of the electrical circuit or prevent the electrical circuit from functioning. In implementations described herein, each seat assembly is configured to absorb electrical charges, collectively reducing electromagnetic interference in the aircraft by at least 90%.

Figure 2:
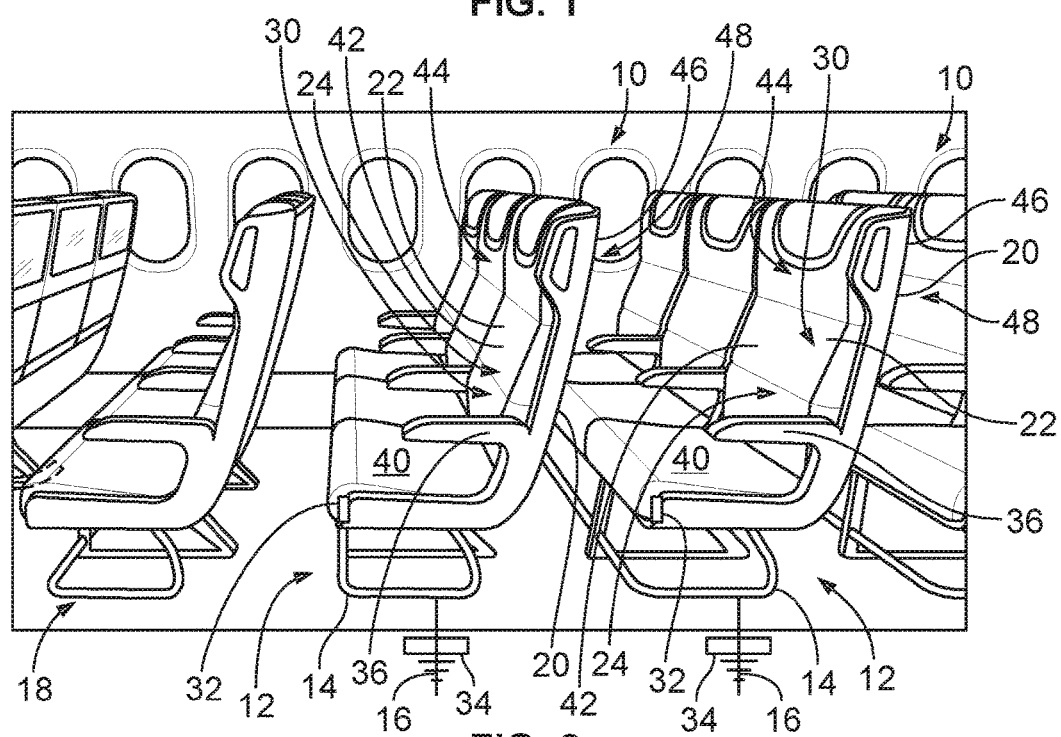
FIG. 2 is a side view of an example seat assembly of a plurality of seat assemblies configured in a row in an aircraft, according to various embodiments.

Referring now to the figures, FIG. 1 is a perspective view of example seat assemblies configured in a row of seat assemblies in an aircraft, according to various embodiments. FIG. 2 is a side view of an example seat assembly of a plurality of seat assemblies configured in a row of seat assemblies in an aircraft, according to various embodiments. Each seat assembly is configured to absorb electrical charges, for example, emitted by or transmitted through a user of the seat assembly, e.g., a passenger of the aircraft sitting in a seat of the seat assembly. The absorbed electrical charges are produced by one or more electronic devices used by the user and/or other passengers in the aircraft, the passengers, the aircraft, and/or aircraft equipment, e.g., the aircraft's navigation and communication equipment and systems. The absorbed electrical charges, absorbed by the seat assembly or plurality of seat assemblies, reduce electromagnetic interference in the aircraft. In some example embodiments, the absorbed electrical charges reduce electromagnetic interference in the aircraft by at least 20%. In other example embodiments, the absorbed electrical charges may reduce electromagnetic interference in the aircraft by at least 80%, 90%, or 95%.

Further, each seat assembly, individually or collectively with adjacent seat assemblies, is configured to at least partially define a ground plane to prevent or limit transmission of electromagnetic field outputs generating EMI between seat assemblies in a common row and/or between seat assemblies in adjacent rows. For example, in example embodiments, a first seat assembly in a first plurality of seat assemblies configured in a first row and a second seat assembly in a second plurality of seat assemblies configured in a second row positioned in front of the first row (with the second seat assembly aligned with the first seat assembly) collectively define a ground plane to prevent or limit transmission of EMI between the first row and the second row. In some example embodiments, the ground plane reduces a sweep area of EMI between the first seat assembly and the second seat assembly by at least 20%. In other example embodiments, the ground plane reduces the sweep area of EMI between the first seat assembly and the second seat assembly by at least 80%, and, particularly, at least 90%, and, more particularly, at least 95%.

As shown in FIGS. 1 and 2, each seat assembly 10 includes a frame 12 having a base 14 electrically coupled to an electric ground 16 of an aircraft 18. A support member 20 is operatively coupled to base 14. In example embodiments, support member 20 is pivotally coupled to base 14 such that support member 20 is pivotally movable with respect to base 14. In example embodiments, a seat 22 is coupled to base 14 and at least a portion of support member 20, e.g., at least a first side 24 of support member 20. Seat 22 includes a conductive substrate layer 30 configured to contact a user, e.g., a passenger on aircraft 18, sitting in seat 22. In certain embodiments, conductive substrate layer 30 is positioned on seat 22 and configured to contact one or more areas of the user's skin. Conductive substrate layer 30 is configured to absorb electrical charges from the user, e.g., electrical charges emitted from and/or transmitted through the user. Conductive substrate layer 30 is also electrically coupled to base 14 to conduct the electrical charges away from the body of the user and toward electric ground 16 of aircraft 18. As a result of this seat assembly configuration, the user's body is commonly grounded with electric ground 16 of aircraft 18. In certain embodiments, a conductive strip 32 electrically couples conductive substrate layer 30 to base 14. A radio frequency (RF) filter 34, shown schematically in FIG. 1, or another suitable filter configured to limit, e.g., filter, EMI, is electrically coupled in series between conductive substrate layer 30 and electric ground 16.

In example embodiments, conductive substrate layer 30 is formed of any suitable conductive material including, without limitation, one or more of the following: a woven material, a non-woven material, carbon fiber, nanocarbon fiber, leather, synthetic leather, and/or carbon leatherette. Conductive substrate layer 30 may include other suitable conductive substrates, materials, and/or fibers in various embodiments. In example embodiments, conductive substrate layer 30 includes one or more conductive substrate, material, and/or fiber formed in one or more layers. In example embodiments, conductive substrate layer 30 includes one or more substrate, material, and/or fiber layer directly or indirectly coupled to a base substrate, e.g., a cushion, of seat 22 or integrated into seat 22 and includes any suitable weaving pattern, material spacing, thread diameter or size, and/or coverage such that conductive substrate layer 30 performs as described herein.

In certain example embodiments, conductive substrate layer 30 includes a fabric interlaced with a conductive trace thread or other conductive material. Suitable conductive trace threads include, without limitation, conductive silver thread, conductive copper thread, conductive gold thread, and/or conductive plastic thread In an alternative example embodiment, a suitable conductive ink is drawn on or applied to an outer surface of seat 22 and/or on other surfaces that may contact the user's skin.

In certain example embodiments, conductive substrate layer 30 is from one (1) weight percent to twenty-five (25) weight percent conductive trace thread by weight of conductive substrate layer 30, and, particularly, conductive substrate layer 30 is from one (1) weight percent to eight (8) weight percent conductive trace thread by weight of conductive substrate layer 30 and, more particularly, conductive substrate layer 30 is from three (3) weight percent to five (5) weight percent conductive trace thread by weight of conductive substrate layer 30. In other example embodiments, conductive substrate layer 30 includes a conductive fabric interlaced with a conductive metal. Suitable conductive fabrics include, without limitation, a plurality of conductive cables, a grid of conductive trace thread, and/or a conductive mesh of conductive cables and/or threads. Suitable conductive metals include, without limitation, conductive silver, conductive copper, and/or conductive gold. In alternative example embodiments, conductive substrate layer 30 may be a fully conductive metal or cloth fabric or material having a weight percent from one (1) weight percent to ninety (90) weight percent. The conductive fabrics or materials may include carbon fiber, carbon nanotubes, metal threads, or any conductive material incorporated into a woven or non-woven fabric seat cover.

Conductive substrate layer 30 forms or contacts a portion of a surface area of seat 22 in example embodiments. In certain embodiments, conductive substrate layer 30 forms or contacts a substantial majority of the surface area of seat 22. For example, conductive substrate layer 30 forms or contacts at least 90% of the surface area of seat 22, and, more particularly, at least 95% of the surface area of seat 22, and, even more particularly, at least 98% of the surface area of seat 22. Further, in certain example embodiments, conductive substrate layer 30 at least partially forms or covers one or more arm rests 36 of seat assembly 10. Forming or covering components or parts, such as arm rests 36, with conductive substrate layer 30 as part of the grounding plane further improves contact with the skin of the user to facilitate earthing or grounding the user.

In example embodiments, seat 22 includes a first panel coupled to base 14, with conductive substrate layer 30 covering the first panel, a second panel coupled to the first side of support member 20, with conductive substrate layer 30 covering the second panel, and/or a third panel coupled to a second side of support member 20 opposite the first side of support member 20, with conductive substrate layer 30 covering the third panel. For example, in certain embodiments, seat 22 includes a first panel coupled to base 14, with conductive substrate layer 30 covering the first panel and a second panel coupled to the first side of support member 20, with conductive substrate layer 30 covering the second panel. In alternative embodiments, seat 22 includes a first panel coupled to base 14, with conductive substrate layer 30 covering the first panel and a third panel coupled to a second side of support member 20 opposite the first side of support member 20, with conductive substrate layer 30 covering the third panel.

As shown in FIG. 2, seat 22 includes a first panel 40 coupled to base 14, a second panel 42 coupled to a first side 44, e.g., a front portion, of support member 20, and a third panel 46 coupled to a second side 48, e.g., a rear portion, of support member 20 opposite first side 44. Conductive substrate layer 30 covers, or substantially covers at least a portion of, each of first panel 40, second panel 42, and third panel 46. In certain example embodiments, conductive substrate layer 30 is directly or indirectly coupled to each of first panel 40, second panel 42, and third panel 46 such that conductive substrate layer 30 is positioned over and covers at least a first surface, e.g., an exposed or outer surface of first panel 40, second panel 42, and third panel 46. Conductive substrate layer 30 may include separate pieces of conductive substrate to cover each of first panel 40, second panel 42, and third panel 46 separately, or conductive substrate layer 30 may be formed of a single continuous piece of conductive substrate to collectively cover first panel 40, second panel 42, and third panel 46.

As described above, each seat assembly 10 is configured to individually or in cooperation with one or more adjacent seat assemblies prevent or limit transmission of EMI between seat assemblies in a common row and/or between seat assemblies in adjacent rows, while absorbing electrical charges emitted by or transmitted through a user of seat assembly 10, e.g., a passenger of aircraft 18, sitting in seat 22.

Providing earthing or grounding in the seat assemblies in an aircraft, e.g., coupling, adding or integrating conductive substrate cover 30 into seat 22, and grounding conductive substrate cover 30 to electric ground 16 of aircraft 18, may provide health benefits to the user sitting in seat 22 including, without limitation, reducing jet lag, protecting the user's body from undesired effects of EMI, reducing inflammation, reducing chronic pain, improving sleep, improving energy levels, lowering stress, normalizing biological rhythms, such as circadian rhythm, and normalizing blood pressure and blood flow. In addition, such earthing or grounding may relieve muscle tension and reduce headaches and snoring. According to emerging research, such grounding or earthing may provide additional health benefits to a user including, without limitation, lowering stress and promoting calmness by reducing stress hormones, improving menstrual and female hormone symptoms, increasing healing effects, shortening recovery time from injury or athletic activity, and/or improving adrenal health, for example.

Figure 3:
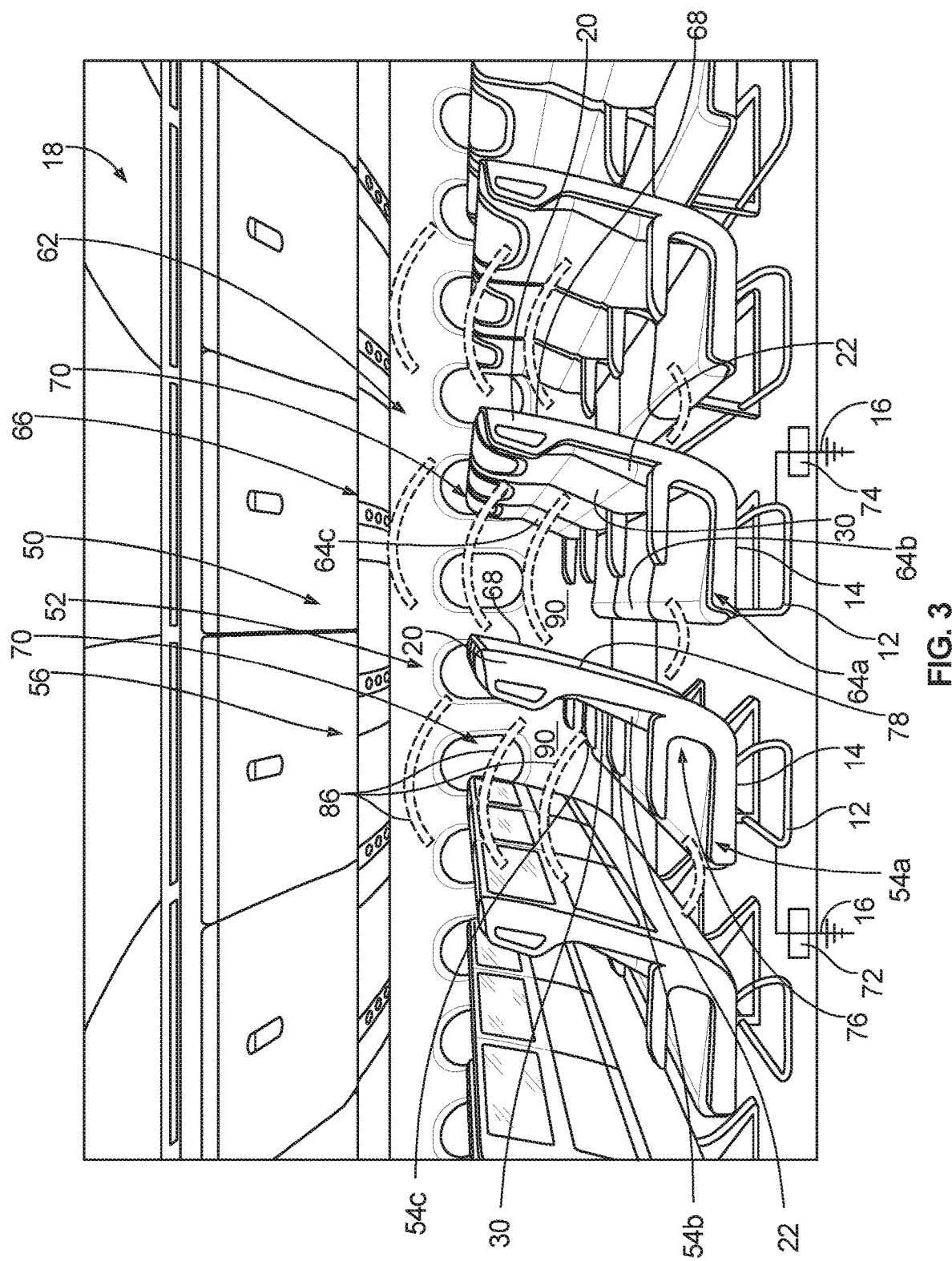
FIG. 3 is a side view of a plurality of seat assemblies configured in a series of rows in an aircraft, according to various embodiments.
Figure 4:
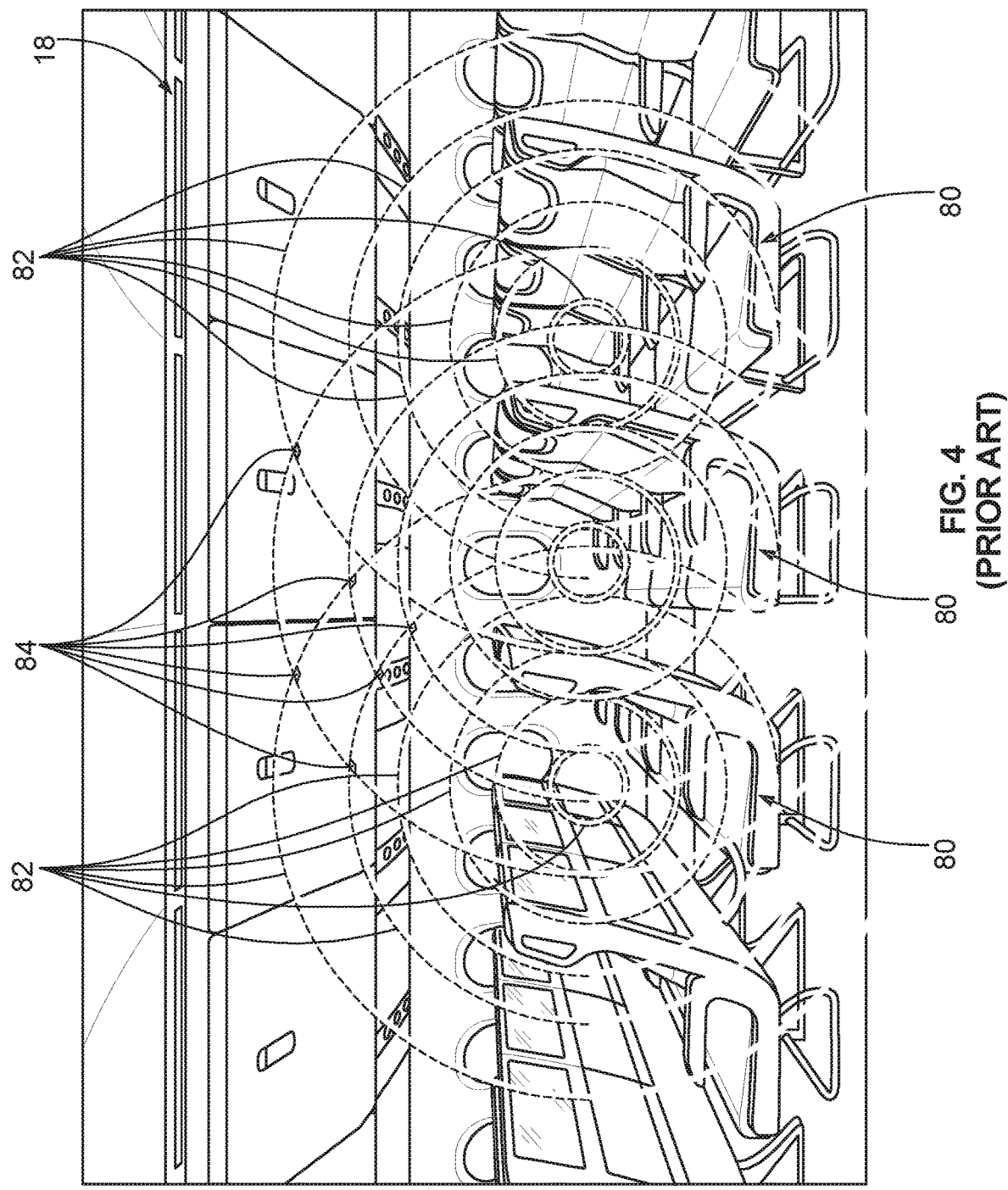
FIG. 4 is a side view of a plurality of conventional seat assemblies configured in a series of rows in an aircraft.

FIG. 3 is a side view of a plurality of seat assemblies configured in a series of rows in an aircraft, according to various embodiments. FIG. 4 is a side view of a plurality of conventional seat assemblies configured in a series of rows in an aircraft. Referring further to FIG. 3, in example embodiments, a system 50 for reducing electromagnetic interference (EMI) in an aircraft includes a first plurality of seat assemblies 52 including any suitable number of adjacent seat assemblies 54, such as seat assemblies 54a, 54b, 54c, for example, configured in a first row 56. In example embodiments, a first seat assembly 54a is identical or similar to seat assembly 10 described above. As described above, first seat assembly 54a includes frame 12 having base 14 electrically coupled to electric ground 16 of aircraft 18. Support member 20 is operatively coupled to base 14. Seat 22 is coupled to base 14 and support member 20. Seat 22 includes conductive substrate layer 30 configured to contact a user sitting in seat 22 and electrically coupled to base 14 to absorb electrical charges emitted by or transmitted through a user of first seat assembly 54a. In example embodiments, a conductive strip, such as conductive strip 32 shown in FIG. 2, electrically couples conductive substrate layer 30 of seat 22 to base 14. Conductive substrate layer 30 is configured to limit transmission of EMI between a forward area and a rear area relative to first seat assembly 54a. In example embodiments, conductive substrate layer 30 is positioned along a portion of seat 22 to limit the EMI transmission between a passenger sitting in first seat assembly 54a and another passenger in an area behind first seat assembly 54a.

As shown in FIG. 3, for example, system 50 also includes a second plurality of seat assemblies 62 including any suitable number of adjacent seat assemblies 64, such as seat assemblies 64a, 64b, 64c, for example, configured in a second row 66 positioned behind first row 56 such that a second seat assembly 64a, identical or similar to seat assembly 10 described above, of second plurality of seat assemblies 62 is positioned behind and aligned with first seat assembly 54a. Similar to first seat assembly 54a, second seat assembly 64a includes frame 12 having base 14 electrically coupled to electric ground 16 of aircraft 18. Support member 20 is operatively coupled to base 14. Seat 22 is coupled to base 14 and support member 20. Seat 22 includes conductive substrate layer 30 configured to contact a user sitting in seat 22 and electrically coupled to base 14 to absorb electrical charges emitted by or transmitted through a user of second seat assembly 64a. A conductive strip, such as conductive strip 32, electrically couples conductive substrate layer 30 of seat 22 to base 14.

A conductive substrate panel 68, identical or similar to third panel 46 of seat assembly 10 described above, is coupled to a rear portion of first seat assembly 54a, e.g., coupled to a rear portion of support member 20 of first seat assembly 54a. In example embodiments, conductive substrate panel 68 is electrically coupled to electric ground 16, such that conductive substrate panel 68 of first set assembly 54a and conductive substrate layer 30 of seat 22 of first seat assembly 54a and/or conductive substrate layer 30 of seat 22 of second seat assembly 64a collectively define a ground plane 70, as shown in FIG. 3, to prevent or limit transmission of EMI between first row 56 and second row 66.

In example embodiments, each seat assembly 54 in first plurality of seat assemblies 52 and each seat assembly 64 in second plurality of seat assemblies 62 is electrically coupled to electric ground 16 of aircraft 18. In certain embodiments, a first radio frequency (RF) filter 72, such as RF filter 34, or any filter suitable for limiting or filtering EMI, is electrically coupled in series between each seat assembly 54 of first plurality of seat assemblies 52 and electric ground 16 of aircraft 18. Similarly, first RF filter 72 or an additional RF filter 74 similar or identical to first RF filter 72 is electrically coupled in series between each seat assembly 64 of second plurality of seat assemblies 62 and electric ground 16 of aircraft 18.

In example embodiments, seat 22 of first seat assembly 54a includes a first portion 76 coupled to base 14 and a first side of support member 22, and a second portion 78 coupled to a second side of support member 22 opposite the first side. Conductive substrate layer 30 covers first portion 76 and second portion 78.

Referring now to FIG. 4, in an aircraft 18 having a plurality of conventional seat assemblies 80 configured in a series of rows, undesired electromagnetic interference illustrated by a series of concentric circles 82 representative of one or more electromagnetic field outputs passes through seats and intersects with additional electromagnetic filed outputs at random nodes 84. At nodes 84, the electromagnetic field outputs are amplified and may potentially interfere with the navigation and/or communication equipment and systems of aircraft 18. Ground plane 70, representatively shown in FIG. 3 by arcs 86, forming a sweep area 90, assists in preventing or limiting undesired EMI transmission between first row 56 of seat assemblies 54 and second row 66 of seat assemblies 64. Ground plane 70 also assists in preventing or limiting a risk of electromagnetic interference with the navigation and/or communication equipment and systems of aircraft 18 by preventing or limiting the formation of nodes 84, for example.

In some example embodiments, sweep area 90 of EMI, e.g., from personal electronic devices, is reduced by at least 90%, and, particularly, at least 95%, and, more particularly, at least 98%, as a result of ground plane 70. Further, in certain example embodiments, system 50 may allow for the individual use of portable electronic devices during critical stages of flight by providing mitigation of interference from personal electronic devices. As shown in FIG. 3, for example, ground plane 70 reduces a sweep area of EMI between first seat assembly 54a and second seat assembly 64a. In some examples, ground plane 70 reduces a sweep area of EMI by at least 20%. In other example embodiments, ground plane 70 reduces sweep area 90 of EMI between first seat assembly 54a and second seat assembly 64a by at least 80%, and, particularly, at least 90%, and, more particularly, at least 95%.

Figure 5:
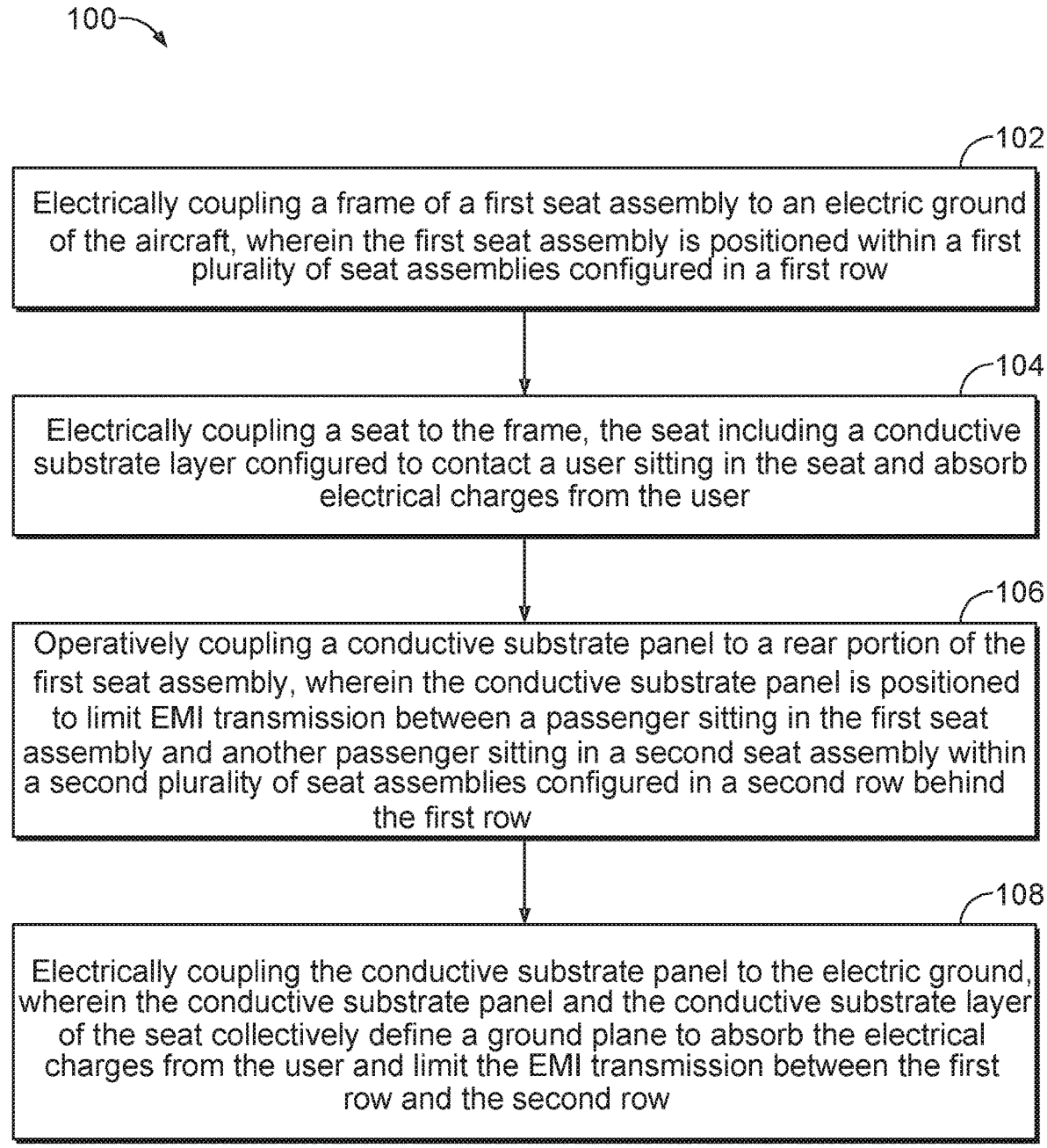
FIG. 5 illustrates an example method for reducing electromagnetic interference in an aircraft, according to various embodiments.

FIG. 5 is a flow diagram of an example method 100 for reducing electromagnetic interference in an aircraft, according to various embodiments. Example method 100 includes electrically coupling 102 frame 14 of first seat assembly 54a to electric ground 16 of aircraft 18, wherein first seat assembly 54a is positioned within first plurality of seat assemblies 52 configured in first row 56. Seat 22 is electrically coupled 104 to frame 14. In example embodiments, seat 22 includes conductive substrate layer 30 configured to contact a user sitting in seat 22 and absorb electrical charges from the user. A conductive substrate panel 68 is operatively coupled 106 to a rear portion of first seat assembly 54a. In example embodiments, conductive substrate panel 68 includes a woven material, a non-woven material, carbon fiber, nanocarbon fiber, leather, synthetic leather, and/or carbon leatherette. Conductive substrate panel 68 is positioned to limit EMI transmission between a passenger sitting in first seat assembly 54a and another passenger sitting in second seat assembly 64a within second plurality of seat assemblies 62 configured in second row 66 behind first row 56. Conductive substrate panel 68 is electrically coupled 108 to electric ground 16, such that conductive substrate panel 68 and conductive substrate layer 30 of seat 22 of first seat assembly 54a collectively define ground plane 70 to absorb the electrical charges from the user and limit transmission of EMI between first row 56 and second row 66.

In certain example embodiments, electrically coupling 104 a seat 22 to frame 14 includes electrically coupling conductive strip 32 between conductive substrate layer 30 and frame 16. An RF filter 34 is electrically coupled in series between conductive substrate layer 30 and electric ground 16. In certain embodiments, conductive strip 32 of each seat assembly 54 in first plurality of seat assemblies 52 is electrically coupled to RF filter 34, which is electrically coupled to electric ground 16.

Figure 6:
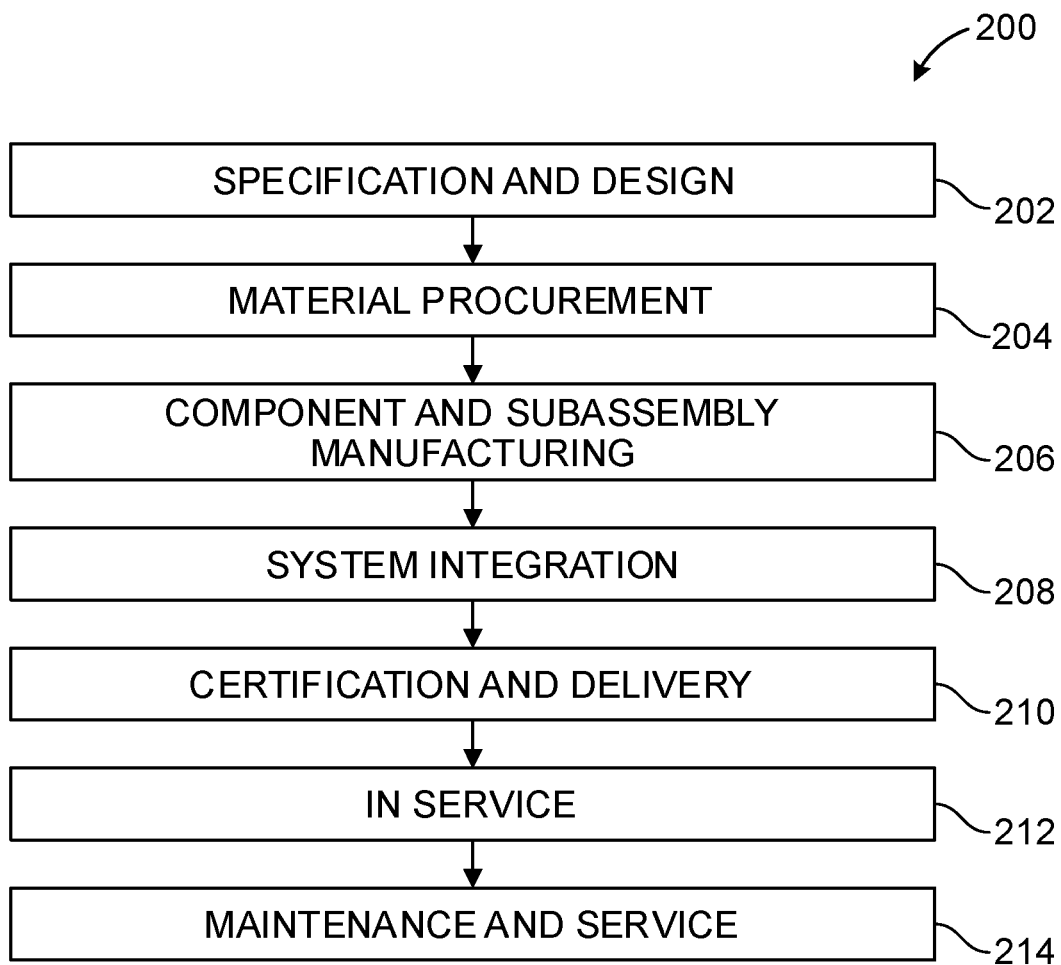
FIG. 6 is a block diagram of an apparatus of manufacturing and service method that advantageously employs seat assemblies, according to various embodiments.
Figure 7:
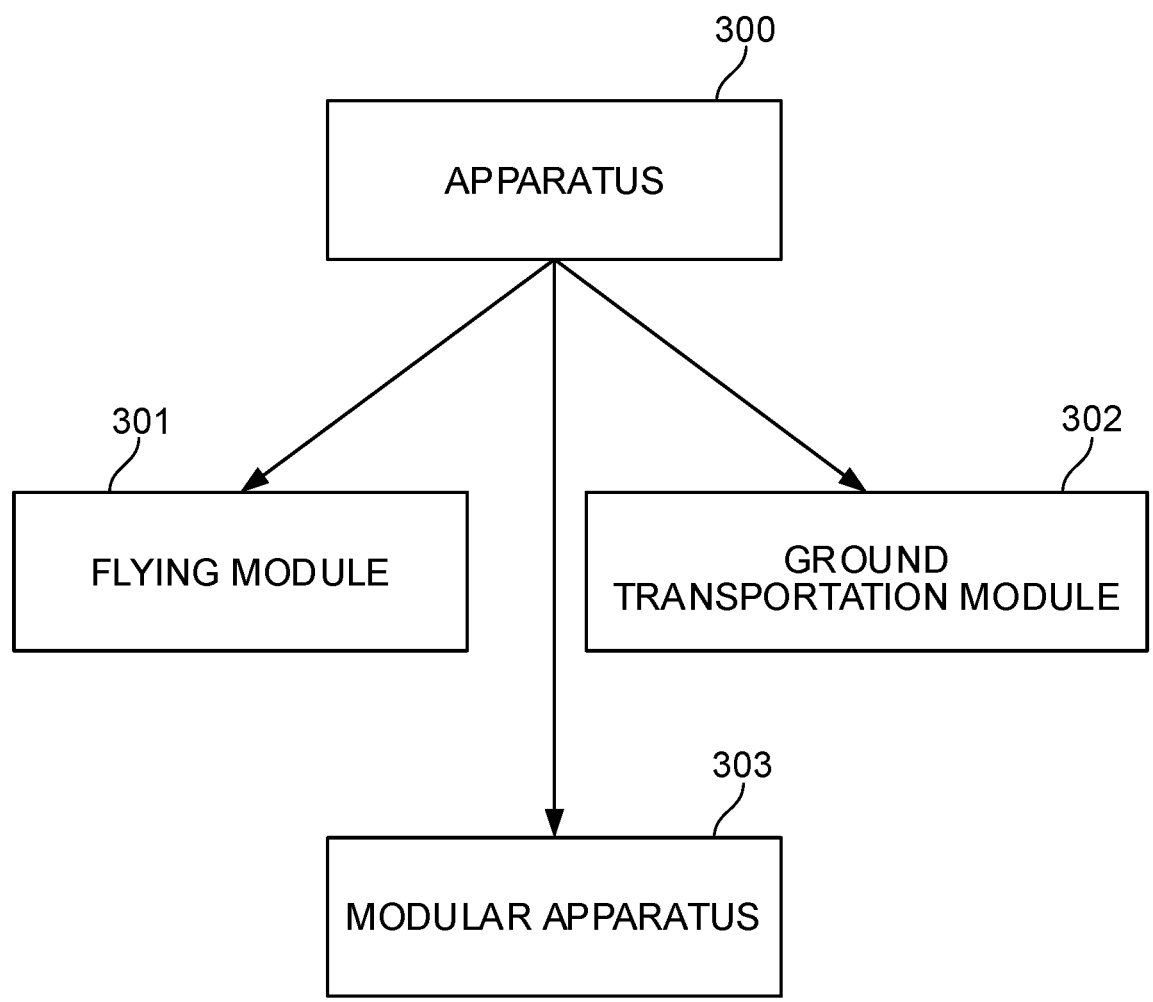
FIG. 7 is a block diagram of an apparatus that advantageously employs seat assemblies, according to various embodiments.
Figure 8:
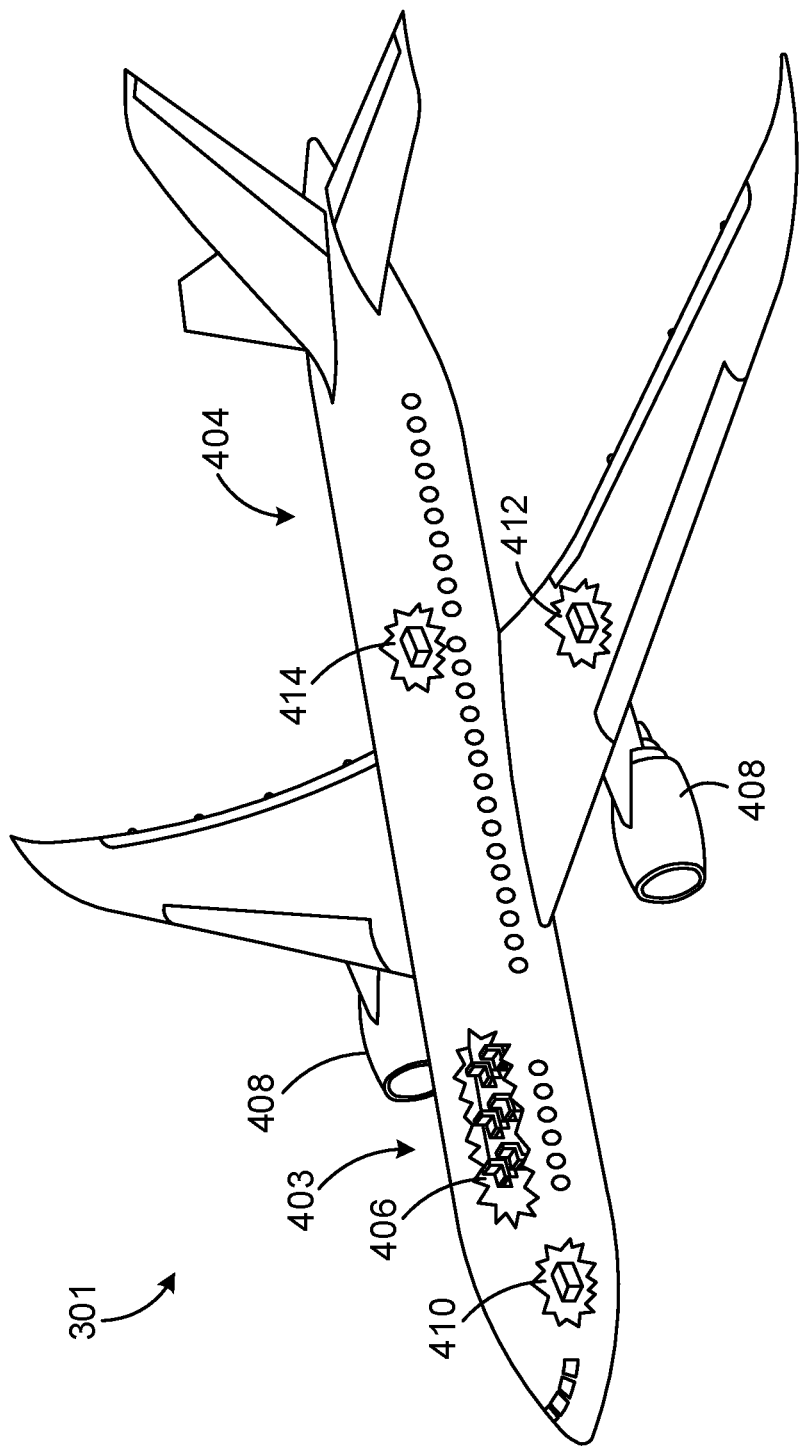
FIG. 8 is a schematic perspective view of a particular flying module.

Some examples of the seat assembly (of FIGS. 1-3) are used in manufacturing and service applications as shown and described in relation to FIGS. 6-8. Thus, implementations of the disclosure are described in the context of an apparatus of manufacturing and service method 200 shown in FIG. 6 and apparatus 300 shown in FIG. 7. In FIG. 6, a diagram illustrating an apparatus manufacturing and service method is depicted in accordance with an implementation. In one implementation, during pre-production, the apparatus manufacturing and service method 200 includes specification and design 202 of apparatus 300 in FIG. 7 and material procurement 204. During production, component and sub-assembly manufacturing 206 and system integration 208 of apparatus 300 in FIG. 7 takes place. Thereafter, apparatus 300 in FIG. 7 goes through certification and delivery 210 in order to be placed in service 212. While in service by a customer, apparatus 300 in FIG. 7 is scheduled for routine maintenance and service 214, which, in one implementation, includes modification, reconfiguration, refurbishment, and other maintenance or service described herein.

In one implementation, each of the processes of the apparatus manufacturing and service method 200 are performed or carried out by a system integrator, a third party, and/or an operator. In these implementations, the operator is a customer. For the purposes of this description, a system integrator includes any number of apparatus manufacturers and major-system subcontractors; a third party includes any number of venders, subcontractors, and suppliers; and in one implementation, an operator is an owner of an apparatus or fleet of the apparatus, an administrator responsible for the apparatus or fleet of the apparatus, a user operating the apparatus, a leasing company, a military entity, a service organization, or the like.

Referring now to FIG. 7, apparatus 300 is provided. As shown in FIG. 7, an example of apparatus 300 is a flying apparatus or module 301, such as an aerospace vehicle, aircraft, air cargo, flying car, and the like. As also shown in FIG. 7, a further example of apparatus 300 is a ground transportation apparatus or module 302, such as an automobile, a truck, heavy equipment, construction equipment, a boat, a ship, a submarine and the like. A further example of apparatus 300 shown in FIG. 7 is a modular apparatus 303 that comprises at least one or more of the following modules: an air module, a payload module and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Referring now to FIG. 8, a more specific diagram of flying apparatus 301 is depicted in which an implementation of the disclosure is advantageously employed. In this example, flying apparatus 301 is an aircraft produced by the apparatus manufacturing and service method 200 in FIG. 6 and includes an airframe 403 with a plurality of systems 404 and an interior 406. Implementations of the plurality of systems 404 include one or more of a propulsion system 408, an electrical system 410, a hydraulic system 412, and an environmental system 414. However, other systems are also candidates for inclusion. Although an aerospace example is shown, different advantageous implementations are applied to other industries, such as the automotive industry, etc.

The following paragraphs describe further aspects of the disclosure:

1A. A seat assembly for an aircraft, the seat assembly comprising:
a frame comprising a base and a support member operatively coupled to the base; and
a seat coupled to the base and a first side of the support member, the seat comprising a conductive substrate layer configured to absorb electrical charges.

2A. The seat assembly of clause 1, wherein the seat further comprises at least one of:
a first panel coupled to the base, the conductive substrate layer covering the first panel;
a second panel coupled to the first side of the support member, the conductive substrate layer covering the second panel; and
a third panel coupled to a second side of the support member opposite the first side, the conductive substrate layer covering the third panel.

3A. The seat assembly of clause 2, wherein the seat comprises the first panel coupled to the base, the conductive substrate covering the first panel and the second panel coupled to the first side of the support member, the conductive substrate layer covering the second panel.

4A. The seat assembly of clause 2, wherein the seat comprises the first panel coupled to the base, the conductive substrate layer covering the first panel and the third panel coupled to a second side of the support member opposite the first side of the support member, the conductive substrate layer covering the third panel.

5A. The seat assembly of any one of clauses 1-4, wherein the electrical charges are produced by at least one of electronic devices, passengers, the aircraft, aircraft equipment, or combinations thereof.

6A. The seat assembly of any one of clauses 1-5, wherein the absorbed electrical charges reduce electromagnetic interference in the aircraft by at least 80%.

7A. The seat assembly of any one of clauses 1-6, wherein the base is electrically coupled to an electric ground of the aircraft.

8A. The seat assembly of clause 7, further comprising a conductive strip electrically coupling the conductive substrate layer to the base.

9A. The seat assembly of clause 7, further comprising a radio frequency (RF) filter electrically coupled in series between the conductive substrate layer and the electric ground.

10A. The seat assembly of any one of clauses 1-9, wherein the conductive substrate layer comprises a fabric interlaced with a conductive trace thread.

11A. The seat assembly of clause 10, wherein the fabric is at least one of a woven material, a non-woven material, carbon fiber, nanocarbon fiber, leather, synthetic leather, or carbon leatherette.

12A. The seat assembly of clause 10, wherein the conductive trace thread is conductive silver thread, conductive copper thread, conductive gold thread, conductive plastic thread, or combinations thereof.

13A. The seat assembly of clause 10, wherein the conductive substrate layer comprises from 1 weight percent to 8 weight percent conductive trace thread by weight of the conductive substrate layer.

14A. The seat assembly of clause 13, wherein an amount of the conductive trace thread is from 3 weight percent to 5 weight percent by weight of the conductive substrate layer.

15A. The seat assembly of any one of clauses 1-14, wherein the conductive substrate layer comprises a conductive fabric interlaced with a conductive metal.

16A. The seat assembly of clause 15, wherein the conductive fabric is a plurality of conductive cables, a grid of conductive trace thread, or a conductive mesh.

17A. The seat assembly of clause 16, wherein the conductive metal is conductive silver, conductive copper, conductive gold, or combinations thereof.

18A. The seat assembly of any one of clauses 1-17, wherein the conductive substrate layer comprises a substantial majority of a surface area of the seat.

19A. A system for reducing electromagnetic interference (EMI) in an aircraft, the system comprising:
a seat assembly of a first plurality of seat assemblies configured in one or more rows, the seat assembly comprising:
a frame including a base electrically coupled to an electric ground of the aircraft and a support member operatively coupled to the base; and
a seat coupled to the base and the support member, the seat including a conductive substrate layer configured to limit transmission of EMI between a forward area and a rear area relative to the seat assembly, the conductive substrate layer electrically coupled to the base.

20A. The system of clause 19, wherein each seat assembly in the plurality of seat assemblies is electrically coupled to the electric ground of the aircraft.

21A. The system of any one of clauses 19-20, further comprising a radio frequency (RF) filter electrically coupled in series between each seat assembly of at least a sub-set of the plurality of seat assemblies and the electric ground of the aircraft.

22A. The system of any one of clauses 19-21, further comprising a conductive strip electrically coupling the conductive substrate layer of the seat to the base.

23A. The system of any one of clauses 19-22, wherein the seat further comprises a first portion coupled to the base and a first side of the support member, and a second portion coupled to a second side of the support member opposite the first side, the conductive substrate layer covering the first portion and the second portion.

24A. The system of any one of clauses 19-23, wherein the conductive substrate layer is positioned along a portion of the seat to limit the EMI transmission between a passenger sitting in the seat assembly and another passenger in an area behind the seat assembly.

25A. The system of any one of clauses 19-24, wherein the ground plane reduces a sweep area of EMI by at least 80%.

26A. A method for reducing electromagnetic interference (EMI) in an aircraft, the method comprising:

electrically coupling a frame of a first seat assembly to an electric ground of the aircraft, wherein the first seat assembly is positioned within a first plurality of seat assemblies configured in a first row;

electrically coupling a seat to the frame, the seat including a conductive substrate layer configured to contact a user sitting in the seat and absorb electrical charges from the user;

operatively coupling a conductive substrate panel to a rear portion of the first seat assembly, wherein the conductive substrate panel is positioned to limit EMI transmission between a passenger sitting in the first seat assembly and another passenger sitting in a second seat assembly within a second plurality of seat assemblies configured in a second row behind the first row; and electrically coupling the conductive substrate panel to the electric ground, wherein the conductive substrate panel and the conductive substrate layer of the seat collectively define a ground plane to absorb the electrical charges from the user and limit the EMI transmission between the first row and the second row.

27A. The method of clause 26, wherein electrically coupling a seat to the frame comprises electrically coupling a conductive strip between the conductive substrate layer and the frame.

28A. The method of any one of clauses 26-27, further comprising electrically coupling a radio frequency (RF) filter in series between the conductive substrate layer and the electric ground.

29A. The method of any one of clauses 26-28, wherein each seat assembly of the first plurality of seat assemblies is electrically coupled to the electric ground.

30A. The method of any one of clauses 26-29, further comprising electrically coupling a radio frequency (RF) filter in series between each seat assembly and the electric ground.

31A. The method of any one of clauses 26-30, wherein the conductive substrate panel comprises at least one of a woven material, a non-woven material, carbon fiber, nanocarbon fiber, leather, synthetic leather, or carbon leatherette.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A seat assembly for an aircraft, the seat assembly comprising:

a frame comprising a base and a support member operatively coupled to the base; and a seat coupled to the base and a first side of the support member, the seat comprising a conductive substrate layer configured to absorb electrical charges, wherein the seat further comprises a first panel coupled to the base, the conductive substrate layer covering the first panel and a third panel coupled to a second side of the support member opposite the first side of the support member, the conductive substrate layer covering the third panel.

2. The seat assembly of claim 1, wherein the seat comprises the first panel coupled to the base, the conductive substrate covering the first panel and the second panel coupled to the first side of the support member, the conductive substrate layer covering the second panel.

3. The seat assembly of claim 1, wherein the electrical charges are produced by at least one of an electronic device, a passenger, the aircraft, aircraft equipment, or combinations thereof.

4. The seat assembly of claim 1, wherein the base is electrically coupled to an electric ground of the aircraft.

5. The seat assembly of claim 4, further comprising a conductive strip electrically coupling the conductive substrate layer to the base.

6. The seat assembly of claim 4, further comprising a radio frequency (RF) filter electrically coupled in series between the conductive substrate layer and the electric ground.

7. The seat assembly of claim 1, wherein the conductive substrate layer comprises a fabric interlaced with a conductive trace thread.

8. The seat assembly of claim 7, wherein the fabric is at least one of a woven material, a non-woven material, carbon fiber, nanocarbon fiber, leather, synthetic leather, or carbon leatherette.

9. The seat assembly of claim 7, wherein the conductive trace thread is conductive silver thread, conductive copper thread, conductive gold thread, conductive plastic thread, or combinations thereof.

10. The seat assembly of claim 1, wherein the conductive substrate layer comprises a conductive fabric interlaced with a conductive metal.

11. The seat assembly of claim 10, wherein the conductive fabric comprises a plurality of conductive cables, a grid of conductive trace thread, or a conductive mesh.

12. The seat assembly of claim 11, wherein the conductive metal is conductive silver, conductive copper, conductive gold, or combinations thereof.

13. A system for reducing electromagnetic interference (EMI) in an aircraft, the system comprising:

a seat assembly of a first plurality of seat assemblies configured in one or more rows, the seat assembly comprising:

a frame including a base electrically coupled to an electric ground of the aircraft and a support member operatively coupled to the base; and a seat coupled to the base and the support member, the seat including a conductive substrate layer configured to limit transmission of EMI between a forward area and a rear area relative to the seat assembly, the conductive substrate layer electrically coupled to the base; and wherein the seat further comprises a first portion coupled to the base and a first side of the support member, and a second portion coupled to a second side of the support member opposite the first side, the conductive substrate layer covering the first portion and the second portion.

14. The system of claim 13, wherein each seat assembly in the plurality of seat assemblies is electrically coupled to the electric ground of the aircraft.

15. The system of claim 13, further comprising a radio frequency (RF) filter electrically coupled in series between each seat assembly of at least a sub-set of the plurality of seat assemblies and the electric ground of the aircraft.

16. The system of claim 13, further comprising a conductive strip electrically coupling the conductive substrate layer of the seat to the base.

17. The system of claim 13, wherein the conductive substrate layer is positioned along a portion of the seat to limit the EMI transmission between a passenger sitting in the seat assembly and another passenger in an area behind the seat assembly.

18. A method for reducing electromagnetic interference (EMI) in an aircraft, the method comprising:
electrically coupling a frame of a first seat assembly to an electric ground of the aircraft, wherein the first seat assembly is positioned within a first plurality of seat assemblies configured in a first row;
electrically coupling a seat to the frame, the seat including a conductive substrate layer configured to contact a user sitting in the seat and absorb electrical charges from the user;
operatively coupling a conductive substrate panel to a rear portion of the first seat assembly, wherein the conductive substrate panel is positioned to limit EMI transmission between a passenger sitting in the first seat assembly and another passenger sitting in a second seat assembly within a second plurality of seat assemblies configured in a second row behind the first row; and
electrically coupling the conductive substrate panel to the electric ground, wherein the conductive substrate panel and the conductive substrate layer of the seat collectively define a ground plane to absorb the electrical charges from the user and limit the EMI transmission between the first row and the second row.

19. The method of claim 18, wherein electrically coupling a seat to the frame comprises electrically coupling a conductive strip between the conductive substrate layer and the frame.

20. The method of claim 18, further comprising electrically coupling a radio frequency (RF) filter in series between the conductive substrate layer and the electric ground.

21. The method of claim 18, wherein each seat assembly of the first plurality of seat assemblies is electrically coupled to the electric ground.

22. The method of claim 21, further comprising electrically coupling a radio frequency (RF) filter in series between each seat assembly and the electric ground.

23. The method of claim 18, wherein the conductive substrate panel comprises at least one of a woven material, a non-woven material, carbon fiber, nanocarbon fiber, leather, synthetic leather, or carbon leatherette.

* * * * *